United States Patent Office 2,717,203
Patented Sept. 6, 1955

2,717,203

METHOD OF PRODUCING APERTURE IN HOLLOW ARTICLE

Jan Anton Willem van Laar, Eindhoven, Netherlands, assignor to Hartford National Bank and Trust Company, Hartford, Conn., as trustee No Drawing. Application May 29, 1953, Serial No. 358,541

Claims priority, application Netherlands June 25, 1952

8 Claims. (Cl. 41—42)

This invention relates to hollow articles furnished with an aperture and to a method of manufacturing them, more particularly to articles comprising a cavity of capillary size.

In accordance with the invention use is made, in the manner to be described hereinafter, of a corrosive liquid by means of which said aperture is formed.

The invention comprises a method of making hollow articles furnished with an aperture and is characterized in that the cavity of the article contains a liquid, the article being placed in a liquid etching its wall, and liquid flowing from the said cavity into the etching liquid after an aperture has been formed by etching.

The invention further comprises articles with opened cavities obtained by means of the aforesaid method.

The invention has the advantage of permitting very small apertures to be obtained. This is of particular importance for glass capillary tubes used, for example, in an electro-chemical measuring device comprising a glass electrode for determining the electromotive force of a galvanic element.

Since, in accordance with the invention, liquid is caused to flow from the cavity into the etching liquid, contamination of the first-mentioned liquid by etching liquid does not occur in the cavity. To this end, in a particular example of the invention, pressure is exerted on the liquid of the cavity, which in making an extremely small aperture is necessary for bringing about the desired issuance of liquid from the cavity.

In order to make the invention better understood it is pointed out that it is known to seal glass capillary tubes and to open the seal by grinding. It has further been proposed to insert a thin metal wire in a glass capillary tube or in a ceramic or synthetic resin mass, the metal wire subsequently being removed by chemical agency. The size of the apertures thus obtained depends upon the diameter of the metal wire used or the accuracy with which material is removable by grinding.

According to the invention it is possible to make capillary tubes with an aperture having a diameter smaller than 0.1 mm. and it has even proved possible to form an aperture of $0.1\mu$ in glass capillary tubes.

As soon as the desired aperture is formed during the etching operation, liquid contained in the cavity issues, according to the invention, and drives the etching agent away from the aperture to prevent further etching and widening of the aperture. To this end, the liquid is preferably so composed as to dilute the etching agent to a concentration such that the etching effect ceases. As an alternative, the composition may be such that the etching agent is neutralised chemically.

In order to determine whether the etching has so far proceeded as to form the desired aperture either the etching agent or the liquid in the capillary tube may be furnished with an indicator showing by coloration that the two liquids engage each other.

In a preferred example of the method according to the invention an electromotive force is provided between the etching agent and the liquid contained in a capillary tube. As soon as the aperture forms an ammeter provided in the circuit will deflect and then the etching operation may be terminated, by removing the capillary tube out of the etching fluid and washing it.

As stated above the invention is of particular importance for making glass capillary tubes having a small aperture for use with the said electro-chemical measuring device.

A capillary tube with a small discharge opening has the advantage that the liquid wherein the measurement is performed is as little as possible contaminated by electrolyte solution flowing from the capillary tube into the liquid. If for this purpose narrow capillary tubes are used the required flow of liquid necessitates high pressures, a capillary tube having an inner diameter of $10^{-5}$ cms. and a length of 1 mm. then requiring a pressure of approximately 2000 atm. By giving the capillary tube a larger inner diameter and by causing the latter to taper up to the small discharge opening it can be achieved that a sufficient flow of liquid through the capillary tube is obtained at a low technically easily realisable pressure. It has been found that in this case one half apex of the inner cone of the capillary tube near the discharge opening should preferably have a cotangent alpha larger than 5.

In order that the invention may be readily carried into effect it will now be described by giving an example of the method of manufacture of such a capillary tube.

A glass tube 25 cms. long having an outer diameter of 6 mms. and an inner diameter of 3 mms. is heated at the point intermediate its length and drawn out to a capillary tube having a wall thickness of 1 mm. and an inner diameter of 1 mm. This narrowed portion is subsequently heated by means of a small flame over a distance of 0.5 cm. so that the glass walls fuse together, the capillary tube then being severed at a minimum distance from the cavity in the capillary tube.

The tube is subsequently filled with a mixture of 1.0 n KNO₃ and 1.0 n NaNO₃ at a pressure of 1 atm. above atmospheric pressure and placed in a paraffin block filled with hydrofluoric acid solution, followed by etching. An electric circuit comprising a galvanometer is provided between the hydrofluoric acid solution and the liquid in the capillary tube. As soon as the galvanometer deflects the etching operation is interrupted by removing the capillary tube and the capillary tube is washed with water. The glass capillary tube thus obtained has a tapering inner cavity terminating in an opening of $0.1\mu$.

A suitable choice of the etching agent and the liquid filling the capillary tube permits the etching to continue in order to widen the opening, if desired.

A glass tube 25 cms. long having an outer diameter of 6 mms. and an inner diameter of 3 mms. is heated at the point intermediate its length and drawn out to a capillary tube having a wall thickness of 1 mm. and an inner diameter of 1 mm. This narrowed portion is subsequently heated by means of a small flame over a distance of 0.5 cm. so that the glass walls fuse together, the capillary tube then being severed at a minimum distance from the cavity in the capillary tube. The tube is subsequently filled with water at a pressure of 1 atmosphere above atmospheric pressure and placed in a paraffin block filled with hydrofluoric acid solution, followed by etching. As soon as the aperture is formed during the etching operation, the water flows into the etching fluid, which is diluted wherby the etching action ceases. The etching operation is interrupted and the capillary tube having an opening of approximately $\frac{1}{2}\mu$ is washed with water.

What is claimed is:

1. A method of making hollow articles furnished with an aperture, comprising, filling the cavity of the article with a liquid, placing the article in a liquid etching bath until the liquid flows from said cavity into the etching bath after an aperture has been formed by etching.

2. A method as claimed in claim 1, in which the cavity is a capillary cavity.

3. A method as claimed in claim 2, in which the cavity is a capillary in a glass tube.

4. A method as claimed in claim 3, in which the liquid in the cavity is subjected to a pressure.

5. A method as claimed in claim 4, in which the glass tube is heated to a temperature at which the capillary cavity is locally sealed, and the tube is severed at the seal such that the smallest wall thickness of the tube is located between the severed section and the cavity.

6. A method as claimed in claim 5, in which the etching liquid contains hydrofluoric acid.

7. A method as claimed in claim 5, in which the apex of the inner cone in the proximity of the seal has a cotangent alpha larger than 5.

8. A method as claimed in claim 5, in that a potential difference is applied between the liquid contained in the cavity and the etching liquid and the current therebetween is measured.

References Cited in the file of this patent

UNITED STATES PATENTS

| | | |
|---|---|---|
| 1,811,765 | Snelling | June 23, 1931 |
| 2,572,597 | Connor | Oct. 23, 1951 |

FOREIGN PATENTS

| | | |
|---|---|---|
| 305,616 | Germany | Jan. 6, 1920 |